(12) United States Patent
Bantz et al.

(10) Patent No.: US 7,546,639 B2
(45) Date of Patent: Jun. 9, 2009

(54) PROTECTION OF INFORMATION IN COMPUTING DEVICES

(75) Inventors: David F Bantz, Portland, ME (US); Thomas E Chefalas, Somers, NY (US); Steven J Mastrianni, Unionville, CT (US); Clifford Alan Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 10/993,721

(22) Filed: Nov. 19, 2004

(65) Prior Publication Data

US 2006/0112418 A1    May 25, 2006

(51) Int. Cl.
| | |
|---|---|
| G06F 7/04 | (2006.01) |
| G06F 17/30 | (2006.01) |
| G06F 12/14 | (2006.01) |
| G06F 11/00 | (2006.01) |
| G06F 12/16 | (2006.01) |
| G06F 15/18 | (2006.01) |
| G06K 9/00 | (2006.01) |
| H04L 9/32 | (2006.01) |
| H04L 12/14 | (2006.01) |
| G08B 23/00 | (2006.01) |

(52) U.S. Cl. ................. 726/27; 726/2; 726/23
(58) Field of Classification Search ............ 729/2, 729/23, 27
See application file for complete search history.

(56) References Cited

U.S. PATENT DOCUMENTS

| | | | | |
|---|---|---|---|---|
| 6,105,136 | A * | 8/2000 | Cromer et al. | 726/34 |
| 6,233,506 | B1 * | 5/2001 | Obradovich et al. | 701/1 |
| 6,362,736 | B1 * | 3/2002 | Gehlot | 340/568.1 |
| 6,570,610 | B1 * | 5/2003 | Kipust | 348/156 |
| 6,725,379 | B1 * | 4/2004 | Dailey | 726/35 |
| 6,763,315 | B2 * | 7/2004 | Xydis | 702/127 |
| 6,900,723 | B2 * | 5/2005 | Yamanaka et al. | 340/426.1 |
| 7,024,698 | B2 * | 4/2006 | Tanaka et al. | 726/26 |
| 7,039,392 | B2 * | 5/2006 | McCorkle et al. | 455/411 |
| 2002/0108058 | A1 * | 8/2002 | Iwamura | 713/201 |
| 2002/0133590 | A1 * | 9/2002 | McBrearty et al. | 709/225 |

OTHER PUBLICATIONS

Lance Spitzner; Honeypots: Catching the Insider Threat; IEEE; Proceedings of the 19th Annual Computer Security Applications Conference; 2003.*

* cited by examiner

*Primary Examiner*—Kambiz Zand
*Assistant Examiner*—James Turchen
(74) *Attorney, Agent, or Firm*—Harrington & Smith, PC

(57) ABSTRACT

The present invention provides techniques for protecting information in a computing device. For instance, a location of the computing device is detected. It is determined whether the location is an unauthorized location. Access to the information is restricted in response to the location being an unauthorized location. As another example, information in a computing device may be protected by detecting location of the computing device. It is determined whether the location is an unauthorized location. One or more decoy files are created in the information in response to the location being an unauthorized location.

34 Claims, 4 Drawing Sheets

PROTECTION OF INFORMATION IN COMPUTING DEVICES

FIELD OF THE INVENTION

The present invention relates generally to computing devices and relates more specifically to protection on information in computing devices.

BACKGROUND OF THE INVENTION

Portable computing devices such as persona digital assistants (PDAs) and notebook computers are easily stolen or misplaced. A stolen or misplaced computing device can pose a security risk or risk of the disclosure of confidential information contained in the computing device to a competitor or an unauthorized person. Locating the computing devices, particularly when stolen, can be extremely unlikely; the best chance of locating and recovering stolen or misplaced equipment is if vendors keep a database of such equipment, much like a stolen vehicle database. Typically, vendors do not keep such a database and therefore most users who have their computing device stolen do not expect to recover the device. In certain situations, more important than recovery of the computing device itself is that the data contained in the computing device not be disclosed to unauthorized people or lost.

Thus, what is needed are a system and method for protecting a computing device and the data contained in a misplaced or stolen computing device.

SUMMARY OF THE INVENTION

The present invention provides techniques for protecting information in a computing device. For instance, a location of the computing device is detected. It is determined whether the location is an unauthorized location. Access to the information is restricted in response to the location being an unauthorized location.

As another example, information in a computing device may be protected by detecting location of the computing device. It is determined whether the location is an unauthorized location. One or more decoy files are created in the information in response to the location being an unauthorized location.

Further and still other advantages of the present invention will become more clearly apparent when the following description is read in conjunction with the accompanying drawing.

DETAILED DESCRIPTION

The present invention relates to a system and method for protecting a misplaced or stolen computing device by restricting access to information contained therein. An exemplary implementation of the invention also provides communicating location of the computing device and possibly the information to a server. Location of the computing device can be provided by any number of means, including two-dimensional or three-dimensional trilateration utilizing global positioning satellite (GPS) communications, distance information derived from network access points or distance derived from known network locations, or various other types of position determination mechanisms.

Embodiments of the present invention reside in a set of components that facilitate a protection method. A first component in certain embodiments is a motion detector (e.g., an accelerometer or any other type of motion sensing device) that senses movements of the computing device to be protected. A threshold of movement triggering an event or an alarm is adjustable by, e.g., the user or device manufacturer. A second component in certain embodiments is a position detector (e.g., a GPS device) for providing position of the computing device. A third component in certain embodiments is transceiver (e.g., to communicate using a wired or wireless network connection device or having network connection capability) for communicating information to a server or to a third party service provider. Using one or more of these components in combination results in a number of possible protection systems that can sense that the computing device is being moved and where the computing device is located while such movement is taking place. An event (e.g., that a computing device is undergoing significant movement and, hence, is probably misplaced or stolen) can cause event information to be generated that can be used by a component (e.g., or components) in the protection system to perform the exemplary operations described hereinafter. The generated event information may be handled by a server or third party service that decodes event information and causes (e.g., by communicating one or more commands to the computing device) the actions disclosed by the teachings herein to protect the information contained in the computing device. Another aspect of the invention is a set of methods that perform specified actions as a result of a particular event generated by one of the components of the protection system in order to restrict access to information contained in a computing device.

Figure 1:
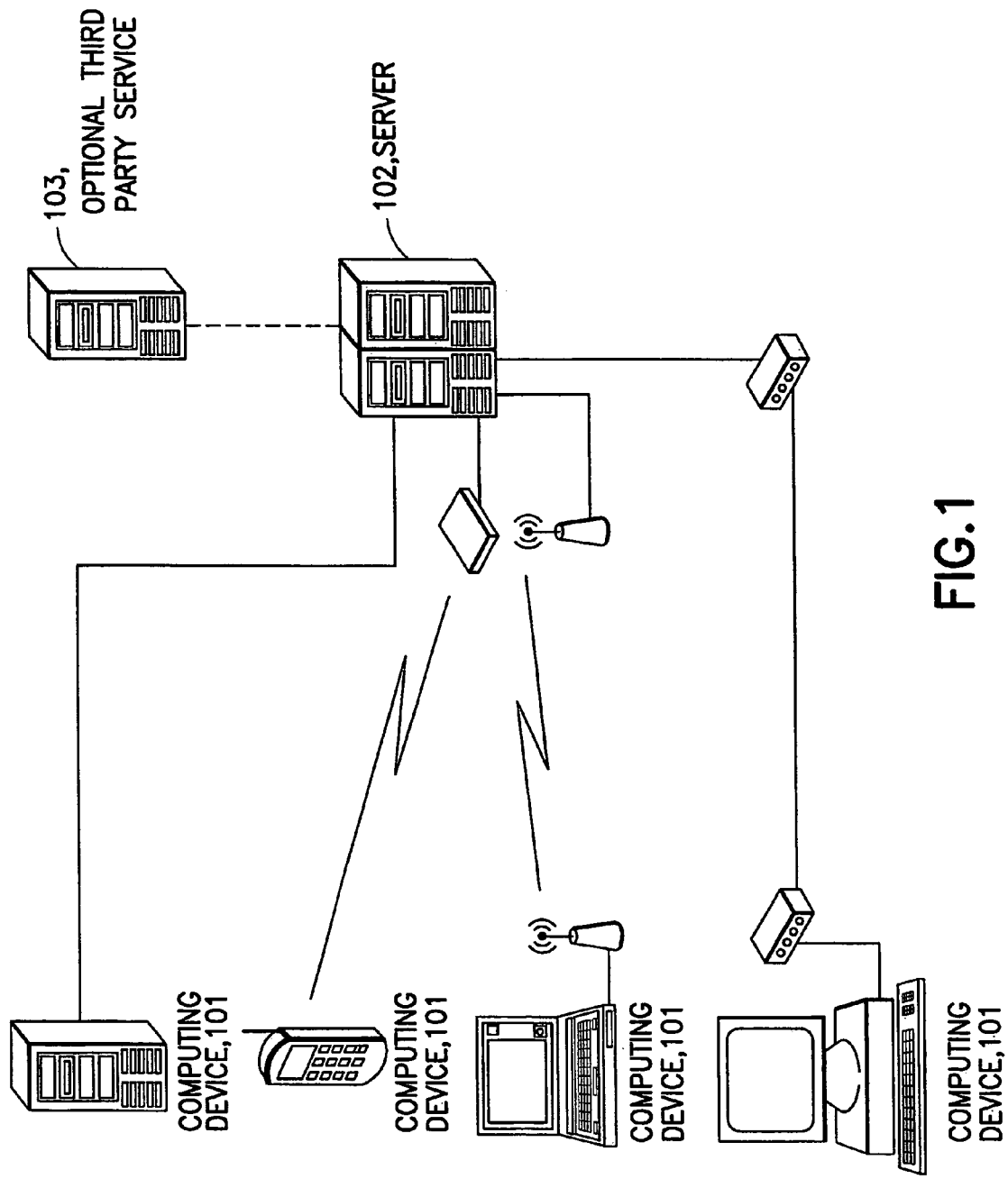
FIG. 1 is a block diagram of a computing device having a protection system for protecting the computing device and information contained therein.

Referring now to the figures and to FIG. 1 in particular, each computing device 101 contains one or more of the following (not shown in FIG. 1): GPS transceiver and a network interface (see network interface 223 in FIG. 2) such as a wireless network interface, other wireless transceiver such as Infrared, Bluetooth, cellular modem, or any other type of wired or wireless connectivity interface. A computing device 101 can be any device having information to be protected, such as a cellular phone, a personal digital assistant (PDA), a portable computer system, a desktop/tower computer system, a portable hard drive, and a network attached storage system.

Figure 2:
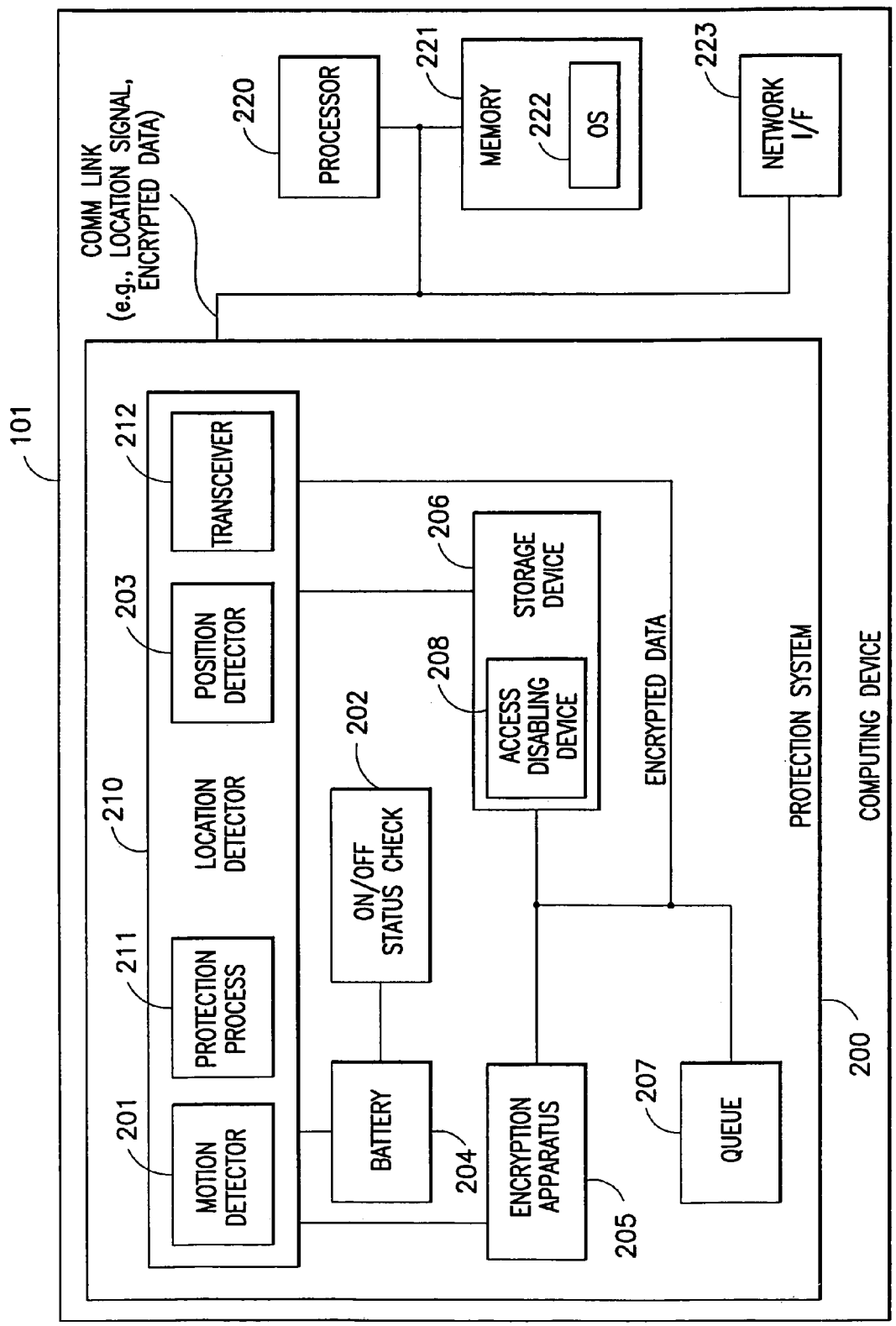
FIG. 2 is a block diagram of a computing device having an associated protection system.

FIG. 2 shows an exemplary computing device 101 having an associated protection system 200. Computing device 101 comprises a processor 220 that is coupled to a memory 222, a network interface 223 and to the protection system 200. The memory 222 has an operating system (OS) 222. The protection system 200 comprises a location detector 210, a battery 204, an on/off status check module 202, an encryption apparatus 205, a storage device 206, and a queue 207. The location detector 210 comprises a motion detector 201, a protection process 211, a position detector 203, and a transceiver 212. The storage device 206 comprises an access disabling device 208.

The protection process 211 controls the functions of the protection system 200 and the example of FIG. 2 is shown inside the location detector 210. However, in another embodiment, the protection process 211 may reside anywhere within the protection system 200. For example, the protection system 200 could be a device that is mounted in a computer system (e.g., a computing device 101) in an expansion slot. The protection process 211 could be implemented as a hardware element in the protection system. Alternatively, the protection process 211 could be implemented as firmware, software, or a combination of firmware, software, or hardware. Furthermore, the protection process 211 can be loaded into processor 220 to perform protection functions. The protection system 200 could have its own process and memory. In certain embodiments, the protection process 211 can communicate with the OS 222 in order to prohibit access to the computing device 101. Furthermore, the protection process 211 and other portions of the protection system 200 could be "built into" the computing device 101. For instance, the protection process 211 could be a part of the OS 221, the storage device 206 could be part of memory 221, and the encryption apparatus 205 could be software executed by the processor 220. Moreover, the protection process 211 may be implemented on a signal bearing medium tangibly embodying a program of machine-readable instructions executable by a digital processing apparatus (such as processor 220) to perform operations to protect a computing device.

The storage device 206 is shown as being part of the location detector 210. In this embodiment, the processor 220 accesses the storage device 206 through the protection system 200. In other embodiments, the storage device 206 is separate from but coupled to the protection system 200.

The location detector 210 acts to detect location. In response to the location being an unauthorized location, the protection system 200 (e.g., under control of the protection process 211) can restrict access to information in the computing device. One exemplary technique for restricting access is to disable one or more hardware components of the computing device 101. Typically, any hardware component (e.g., keyboard input device, pointer input device, network communication device such as network interface 223, power supply/battery devices, display communication devices) in the computing device may be disabled, thereby restricting access to information in the computing device (e.g., disabling a keyboard input device and a pointer input device restricts access to information because there are few available techniques for accessing information without a keyboard input and a pointer input). A hardware component may be disabled by reducing functionality of the part (e.g., grounding one output line from a keyboard) or making the hardware component be non-functional.

Another exemplary technique for restricting access to information in the computing device is through software components, such as through OS 222. For example, the protection process 211 (which could become part of OS 222) could cause the OS 222 to request a special password or encryption key from a user and prevent access to operating system components without the password or encryption key. Thus, access is restricted to information on the computing device 101 until a user enters the special password or encryption key. Furthermore, software components could be disabled (e.g., so that the OS 222 is corrupted such that the computing device 101 never loads the OS 222).

While any hardware and software components may be used to restrict access to information on the computing device, the present invention is primarily concerned with limiting access to data such as data stored on the storage device 206. This is because the storage device 206 itself can typically be removed and placed into another computing device 101 and the data on the storage device 206 might be accessed. Thus, certain embodiments of the present invention provide encryption of the data, disabling access to the storage device 206, or both. Certain embodiments of the present invention also provide notification (e.g., to servers) that the computing device 101 is in an unauthorized area and can transmit the information from the computing device 101 to a server.

In an exemplary embodiment, when a computing device 101 is moved, an accelerometer, a motion detection device, a distance measuring device, or any other motion detector 201 having motion-detecting technology (see FIG. 2) coupled to the computing device 101 senses that the movement of the computing device is significant, i.e., the movement exceeds a predetermined distance from a predetermined location or is outside a predetermined area, region, or location. For each type of computing device 101, the threshold of what constitutes a significant movement is typically adjustable within the computing device 101. The adjustability allows the user or administrator to determine what type of or how much movement constitutes a normal movement and what type of or how much movement represents a movement beyond or out of the normal acceptable predetermined range (e.g., and therefore being in an unauthorized location). For example, movement within a building might be acceptable while movement beyond a campus might be unacceptable.

The protection system 200 can determine, illustratively, that the computing device 101 is in an unauthorized location because the protection system 200 can no longer communicate with certain nodes (e.g., wired or wireless servers or wireless access points) on a campus network (e.g., an allowed network). As another example, a user might place a notebook computer (e.g., a computing device 101) at a location and set an "initial location" status. If the notebook is moved a small amount (e.g., a few feet for a predetermined distance) in a short time period (e.g., a predetermined time period), the user may be prompted (e.g., by protection process 211) to enter in a password. If the user does not enter in the correct password, as compared to a special password, within a predetermined time, the protection system 200 can restrict access to information the computing device 101.

The protection system 200, located in computing device 101, checks whether the computing device 101 is on or off using the on/off status check module 203. If the device 101 is off, the protection system 200 powers up some or all of the protection system 101 (and may power some or all of the computing device 101, if necessary) such as the position detector 203, e.g., a GPS receiver or transponder in the protection system, located in computing device 101 that can notify (in an exemplary embodiment) the server 102 or an optional third-party service 103 as to the position of the computing device 101. The transceiver 212 acts to communicate with a network interface 223 in this example. In another example, the transceiver 212 can comprise or be a wired or wireless (or both) network interface such as network interface 223.

It is important to note that the system battery 204 life is prolonged because the computing device 101 need not normally be powered up, and power is used only for a very short period of time to report the event (e.g., that the computing device 101 is in a position that corresponds to an unauthorized location) and then the transceiver (e.g., position detector 203) is turned off. This results in shorts bursts of communication and conservation of battery life. In other implementations, the position may be determined by using a wired or wireless network or by certain types of radio-frequency positioning, such as triangulation, even if the device is currently turned off. If the device in turned on, the transceiver (e.g., as part of position detector 203) begins operating automatically, requiring no user or other automatic intervention.

If for any reason the server 102 cannot be accessed, the protection system 200 may still perform a default security procedure or procedures as configured by the user or administrator. Depending on the configuration preferences, the system 200 may queue 207 information to be sent to the server 102 until a network connection becomes available. Additionally, depending on configuration, the data of the user may be encrypted immediately before being sent or access to the hard drive disabled immediately. Encryption will typically involve techniques using encryption keys, as is known in the art, but may be any technique that modifies the information.

Once the position of the device has been reported, the protection system 200 in certain embodiments offers several options. The user or corporate information technology (IT) policy may specify that if the computing device 101 has been reported stolen, missing, or moved without authorization, that the data contained on the computer be immediately encrypted by encryption apparatus 205 with a key that is not located on the computing device 101 itself. This action prevents unauthorized access to the data, thereby restricting access to the data. Additionally, if the protection system 200 senses a network connection, a copy of the encrypted data can be sent to the server 102. Once the data has been sent successfully, the protection system 200 may, depending on the configuration of the computing device 101, disable access to the hard disk (e.g., storage device 206). Disabling of the hard disk could be performed, for example, by using an access disabling device 208 as part of the hard disk (e.g., storage device 206). The access disabling device 208 can, for instance, sever a physical connection using an embedded device, such as a fusible link, which would not allow access to the hard drive (e.g., a storage device 206) even if the hard drive (e.g., storage device 206) is removed from the computing device 101 and placed in another computing device. Note that a storage device 206 may also be fixed or removable memory, such as memory cards or removable hard drives, and the access disabling device 208 can be used to disable access to such fixed or removable memory. Additionally, the storage device 206 may be separate from but coupled to the protection system 200 if desired. Furthermore, the protection system 200 can be separate but coupled to the computing device 101 if desired.

Figure 3A:
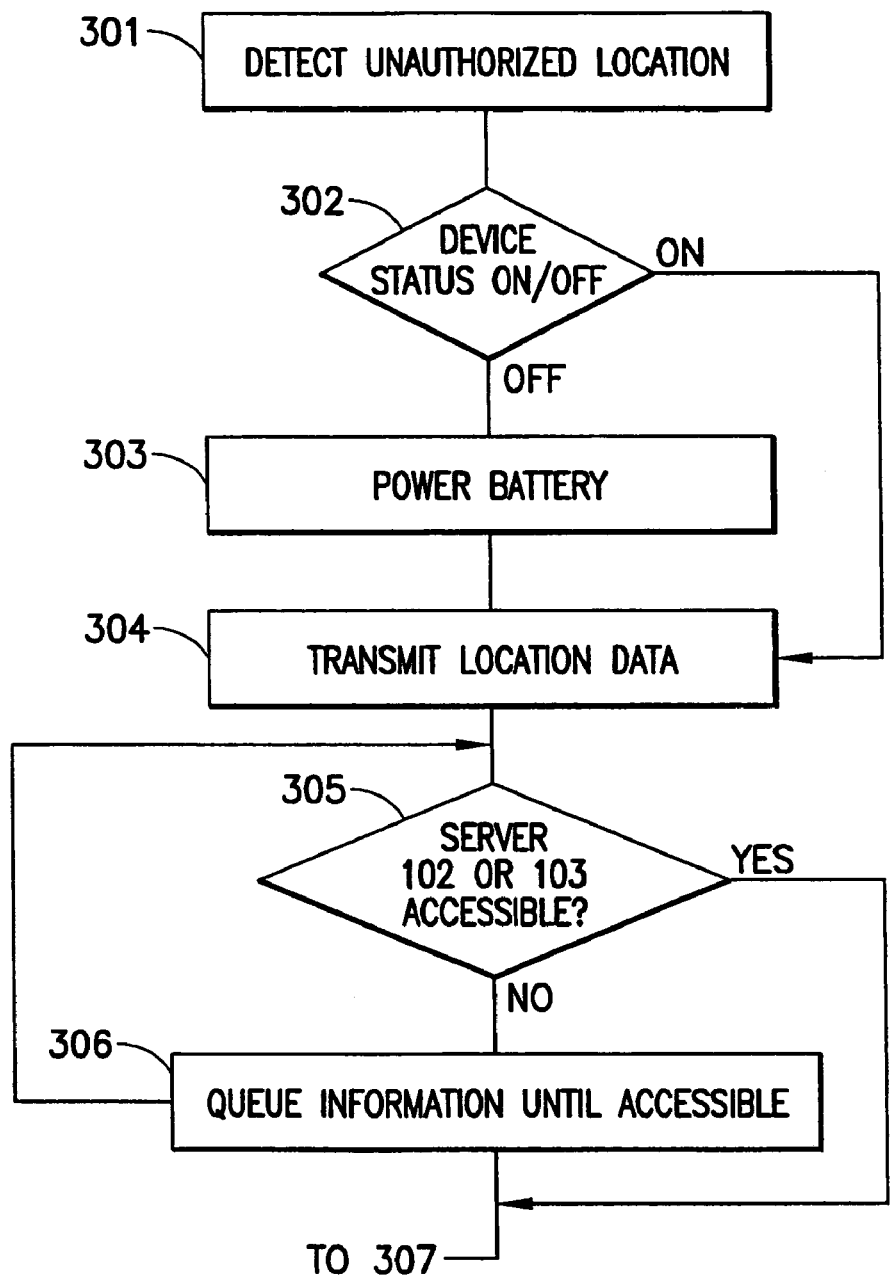
FIGS. 3A and 3B are a flow chart of a method for practicing the present invention.
Figure 3B:
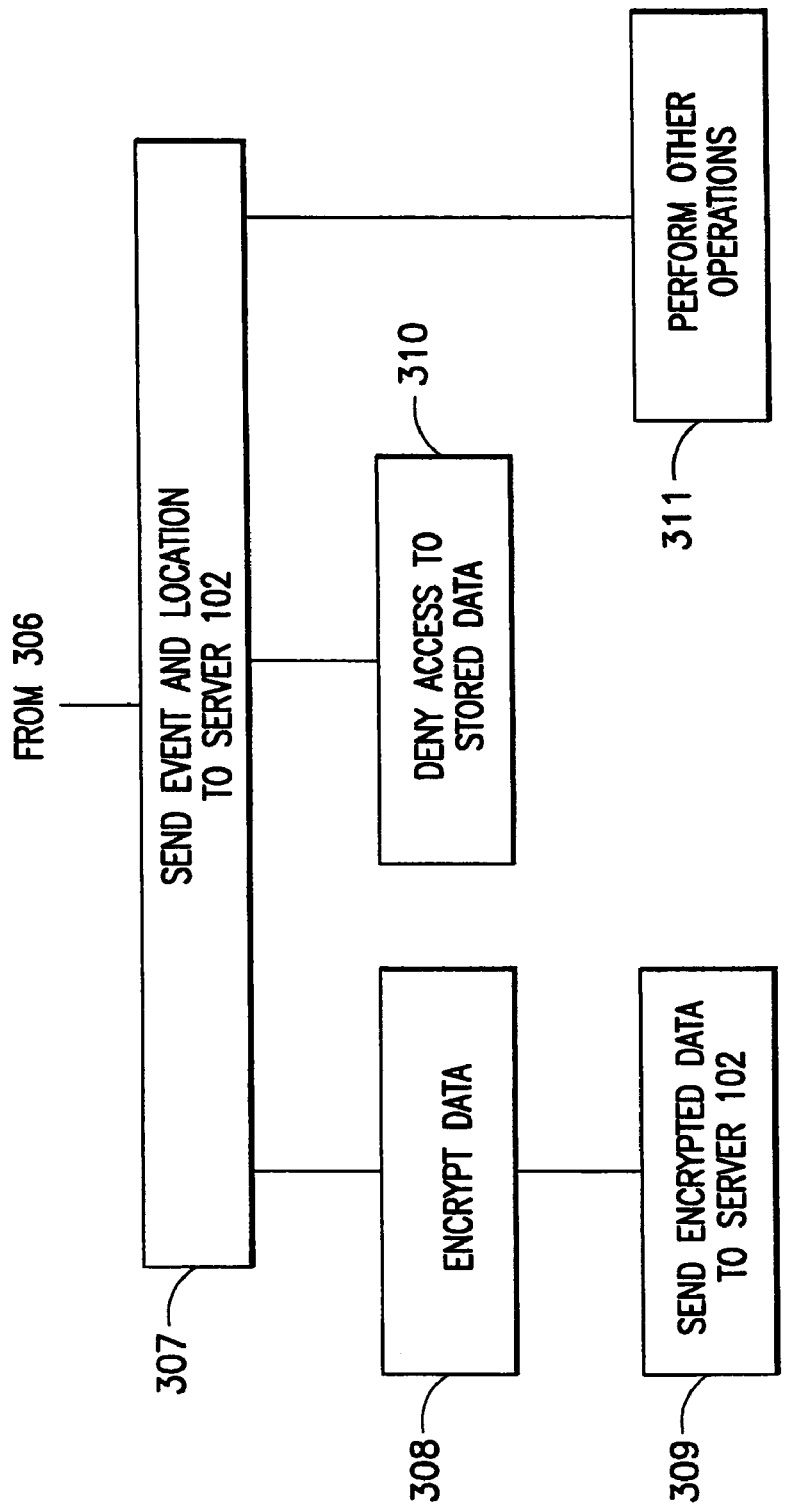

FIGS. 3A and 3B are a flow diagram of an exemplary method for practicing the invention. In step 301, it is determined that the computing device 101 is in an unauthorized location. Such a determination may be made by means of a motion detector 201 such as an accelerometer or other motion sensing device, such as a distance measuring device. Such a motion detector 201 may also comprise a software or hardware device that, for instance, communicates with certain servers or examines network addresses. If the servers cannot be reached or the computing device 101 now has or is using a new network address (e.g., outside one or more ranges of allowable addresses), then an unauthorized location is determined. Any technique for examining network addresses (such as LAN and Internet addresses) may be used.

If the computing device is determined to be in an unauthorized location, the on/off status of the computing device 101 is checked in step 302. If the computing device 101 is off, battery power is turned on briefly in step 303 so that a position detector 203, such as a GPS receiver or transponder or equivalent positioning determining apparatus and an associated transceiver 212 (e.g., and perhaps the network interface 223), can transmit location data concerning the computing device in step 304. If the computing device 101 is on, the position detector 203 and transceiver 212 are already powered to transmit the location data concerning the computing device in step 304.

A check in step 305 is made to determine whether the server 102 or third party receiver 103 is immediately accessible via a network connection. If the receiving device is accessible, location data such as event information and position information for the computing device 101 are immediately transmitted in step 307. The event information indicates that the computing device 101 may be in an unauthorized location. For instance, the event information could be data indicative of "the computing device 101 has been moved outside the secure area," or "the computing device 101 has been moved," "the computing device 101 can no longer communicate with a verification server," or other message indicating the computing device 101 is no longer in an authorized location. Note that there may be a time when a server cannot be communicated with and the computing device 101 could actually reside in an authorized location but because the server (or servers) cannot be reached, the protection system 200 concludes (e.g., perhaps after a predetermined time period, warning to the user, or both) that the computing device 101 is in an unauthorized location.

If the receiving device is not accessible (step 305=No), data for the event information and position information for the computing device 101 are placed in a queue 207 temporarily (step 306), until the receiving device is accessible (step 305=Yes). After sending the data corresponding to the event information and position information to server 102 or to third party server 103, data contained in the storage device 206 of the computing device 101 may be encrypted in step 308 and a copy of the encrypted data is transmitted in step 309 to server 102. Alternatively or additionally, access to a storage device 206 (e.g., a disk drive) in the computing device where data is contained can be denied in step 310, for example, by using the access disabling device 208, which in an exemplary embodiment severs a physical connection such as a fusible link or similar mechanism in the storage device 206.

The actions to be taken upon detecting that the computing device 101 is in an unauthorized location are not limited to the actions described in reference to steps 308, 309, and 310. Alternatively or additionally to steps 308, 309, and 310, other actions may be performed in step 311. For instance, actions may be taken to disable (e.g., modify or make inoperable) software associated with the computing device 101 in order to, for example, deliberately deceive the person having unauthorized possession of the device or provide noises to alert others. For example, the address book of an email program can be altered so as to contain addresses that appear normal, but in fact are registered to tracing agencies. These tracing agencies may immediately determine the source of any email received and use that source information to locate the computing device. Similarly, programs can be altered in order to discover computers in the immediate vicinity and disable them by altering their software or by conducting a denial-of-service attack on them.

Productivity programs, such as document processors, can be altered so as to change or destroy any documents created by them. Media players can be altered so as to cause them to play (for example at maximum volume) a predetermined message, for example a message that says "I'm stolen or missing—please report me to <phone number> and claim your reward." This is an example of an alert message indicating status of the computing device 101. These alert messages could be appended (e.g., silently so that a new user does not see the message) to other communications from the computing device, such as outgoing electronic mail, outgoing instant messages, and sounds being played. Thus, a selected song might play but an "I'm stolen; report me to <internet address>" could accompany the playing of the song. Appending also means that the message could take the place of a portion of other communications (e.g., instead of playing a song, the computing device 101 plays an "I'm stolen!" alert message).

Additional actions that may be taken in step 311 are as follows. One or more decoy files can be created in order to restrict access to information such as one or more original files. In an exemplary embodiment, decoy files correspond to an original file. Generally, a decoy file is created in place of the original file (e.g., the name and/or extension of the original file is changed, the original file is destroyed, and the like, and the decoy file is given the name of the original file) but could also be created in addition to the original file (e.g., there could be nine decoy files and one original file, each of the files having a portion of a name of "Bank Data," but only the original file has a complete set of original data). So, a decoy file could have a similar name as the original file, but with none or some of the data of the original file. For instance, credit card information could be modified, perhaps from a valid credit card number to a credit card number reserved by a bank as a marker for fraud. Optionally, decoy files could have names unrelated to the original file. The times associated with the decoy files and the original file may be modified to may it appear, for instance, that the original file is older than the decoy files.

In another exemplary embodiment, the computing device 101 (e.g., under direction of the protection process 211) could produce decoy files with decoy information such as fake credit numbers, fake passwords, fake financial data, fake identity information such as social security numbers, and the like, where the decoy information has no correspondence to any original files. This could be used, illustratively, when the information to be restricted is trade secret information (e.g., design of a new device, an undisclosed software project, a new advertising campaign, and the like). In this example, an unauthorized person gaining access to the computing device 101 would likely prefer decoy information such as fake credit card numbers, fake financial information, and fake identity information, and therefore access to an original file is restricted because the unauthorized person examines decoy files instead of the original file. The original file may also be processed in ways described herein (e.g., the original file could be encrypted, have its name or extension or both changed, be hidden, and be destroyed).

Files can be destroyed, such as being deleted or erased (e.g., writing data over some or all of the file, erasing or modifying file structures on a hard drive so that files cannot be found, and the like). The names of files could be changed, and the extensions (such as ".doc") could be changed. The computing device could have a portion (some or all) disabled. For instance, disabling devices (e.g., access disabling device 208) could be built in to any hardware component, as described previously, in the computing device 101. The disabling devices could cause permanent disablement of a component or a reversible disablement of a component.

Furthermore, step 311 could involve monitoring internet entry fields (for instance, to pay for something over the internet, or to enter an email address). If the internet entry fields do not match stored entries, then the identifying information (such as name, physical address, email address) could be communicated to servers such as at a recovery service bureau or authorities. It should be noted that minor modifications of information could be matched, such as when "John Public" is entered identifying information and "John Q. Public" is stored identifying information.

In accordance with the teachings of certain embodiments of the present invention, the user may specify a "safe" zone in which the device may be operated normally. If the computing device 101 reports itself at a location that is outside a safe zone, such as a predetermined region, area, or position, the protection system would then begin its encryption routine (e.g., performed by encryption apparatus 205) and optionally disable access to the storage device 206. A safe zone can be any one or more constraints that define a significant movement of the computing device 101, including but not limited to distance from server 102, distance from home or office, name of the network domain, identification (ID) of the user, or various other triggers that would indicate a significant movement.

An automated or manual system may be used to set polices for each file, class of files, or directory (e.g., folder) on the computer. These policies would include specifications for the nature of the protection. A table may contain these policies. An example of such a table is given below:

| POLICY TABLE | |
|---|---|
| FILE | POLICY |
| 1. LotusNotes.nsf (file) | encrypt |
| 2. *.pdf (all files of type) | erase (e.g., self-destruct) |
| 3. Presentations (directory folder) | copy to secure destination when network connection exists, then erase (e.g., self-destruct) |

Additionally, each file and directory may have a new attribute specifying the kind of protective service associated with that file or directory. Policies and attributes may be set, e.g., by the user, by the company that employs a user, or by a service.

While there has been described and illustrated a system and method for protecting information in a computing device, it will be apparent that variations and modifications are possible without deviating from the teachings and broad principles of the present invention which shall be limited solely by the scope of the claims appended hereto.

What is claimed is:

1. A method for protecting information in a computing device, comprising:
   detecting a location of the computing device by detecting one or more network addresses used by the computing device;
   determining whether the location is an unauthorized location by determining whether the detected one or more network addresses are any of one or more predetermined network addresses;
   restricting access to the information in response to the location being an unauthorized location; and
   appending one or more alert messages to one or more other outgoing communications by the computing device in response to the location being an unauthorized location, wherein a given one of the outgoing communications is sent to one or more of a tracing agency or a recovery service bureau, wherein said one or more alert messages are configured to indicate to a recipient of the one or more other outgoing communications that the location of the computing device is an unauthorized location.

2. The method of claim 1, wherein the steps of detecting, determining, and restricting are performed by the computing device.

3. The method of claim 1, wherein:
   the step of detecting location further comprises the step of detecting location of the computing device by measuring one or more distances of the computing device from one or more of at least one network access point and at least one known network location; and wherein the step of determining further comprises the step of determining that the computing device is in an unauthorized location when the one or more distances are larger than a predetermined distance.

4. The method of claim 1, wherein the step of restricting access further comprises the step of modifying one or more software programs on the computing device.

5. The method of claim 1, wherein:
the step of detecting location further comprises the step of detecting that the computing device has moved, from an initial location, a given distance over a given time period; and
the step of determining further comprises the step of determining that the location is an unauthorized location when the given distance and given time period are greater than a predetermined distance and predetermined time period.

6. The method of claim 1, further comprising the step of queuing the location information prior to transmission.

7. The method of claim 1, wherein a storage device comprises the information and wherein the step of restricting access further comprises the step of encrypting the information in response to the location being the unauthorized location.

8. The method of claim 1, wherein the step of restricting access further comprises the step of denying access to a storage device containing the information in response to the location being the unauthorized location.

9. The method of claim 1, wherein the step of restricting access further comprises the step of requiring one or more of a password and an encryption key in response to the location being the unauthorized location.

10. The method of claim 1, wherein the step of restricting access further comprises the step of encrypting at least one file, the at least one file part of the information.

11. The method of claim 1, wherein the step of restricting access further comprises the step of disabling a portion of the computing device.

12. The method of claim 1, wherein:
the method further comprises the step of delivering at least one file in the information to a second computing device; and
the step of restricting access further comprises the step of disabling, after the step of delivering, the at least one file by performing one or more of the following steps: encrypting the at least one file, destroying the at least one file, and creating one or more decoy files corresponding to the at least one file.

13. The method of claim 1, wherein:
the step of detecting location further comprises the step of monitoring of internet entry fields having entered identifying information;
the step of determining whether the location is an unauthorized location further comprises the step of determining that the location is an unauthorized location when the entered identifying information does not match stored identifying information; and
the method further comprises the step of communicating the entered identifying information to one or more servers.

14. The method of claim 1, further comprising: causing a media player of the computing device to play a predetermined message in response to the location being an unauthorized location.

15. The method of claim 1, wherein the appended one or more alert messages replace a portion of the one or more outgoing communications.

16. The method of claim 1, wherein restricting access to the information comprises grounding an output line from a keyboard of the computing device.

17. The method of claim 1, wherein restricting access to the information comprises severing, using a fusible link, a physical connection to a storage device of the computing device, wherein the information is stored on the storage device.

18. The method of claim 1, wherein restricting access to the information comprises creating one or more decoy files.

19. A system for protecting information in a computing device comprising:
one or more devices adapted to detect a location of the computing device by detecting one or more network addresses used by the computing device; and
a protection process coupled to the one or more devices, the protection process adapted to determine whether the location is in an unauthorized position by determining whether the detected one or more network addresses are any of one or more predetermined network addresses, to cause the information in the computing device to be restricted in response to the location being an unauthorized location and to append one or more alert messages to one or more other outgoing communications by the computing device in response to the location being an unauthorized location, wherein a given one of the outgoing communications is sent to one or more of a tracing agency, a recovery service bureau, or a predetermined authority, wherein said one or more alert messages are configured to indicate to a recipient of the one or more other outgoing communications that the location of the computing device is an unauthorized location.

20. The system of claim 19, wherein the computing device comprises the system.

21. The system of claim 19, further comprising an encryption apparatus adapted to encrypt the information, wherein the protection process is adapted to communicate to the encryption apparatus, and wherein the encryption apparatus is adapted to encrypt a portion of the information in response to the communication.

22. The system of claim 19, further comprising a storage device comprising the information, the storage device further comprising an access disabling device, wherein the protection process is adapted to communicate to the access disabling device, and wherein the access disabling device is adapted to disable access to the information in the storage device in response to the communication.

23. The system of claim 19, further comprising one or more components in the computing device, each of the one or more components having an access disabling device, wherein the protection process is adapted to communicate to a given access disabling device, and wherein the access disabling device is adapted to disable a corresponding component in response to the communication.

24. The system of claim 19, wherein the protection process is implemented in one or more of hardware, firmware, and software.

25. The system of claim 24, wherein the protection process is implemented at least in part by software, the computing device comprises a processor, and the processor executes the software of the protection process.

26. The system of claim 24, wherein the protection process is implemented at least in part by software, the computing device comprises a first processor and the system comprises a second processor, and one or more of the first and second processors execute the software of the protection process.

27. The method of claim 18, wherein the information comprises a file, wherein the one or more decoy files are created in addition to the file and the file is not deleted, wherein each of the one or more decoy files has decoy information that corresponds to a portion of the information.

28. The method of claim 18, wherein the information comprises a file and wherein the one or more decoy files have names corresponding to a portion of a name of the file.

29. The method of claim 28, wherein creating the one or more decoy files further comprises modifying times associated with a given one of the one or more decoy files and the file so that a time associated with the given decoy file is later than a time associated with the file.

30. A program storage medium tangibly embodying a program of machine-readable instructions executable by a processor for performing operations, said operations comprising:
 detecting a location of the computing device by detecting one or more network addresses used by the computing device;
 determining whether the location is an unauthorized location by determining whether the detected one or more network addresses are any of one or more predetermined network addresses;
 restricting access to the information in response to the location being an unauthorized location; and
 appending one or more alert messages to one or more other outgoing communications by the computing device in response to the location being an unauthorized location, wherein a given one of the outgoing communications is sent to one or more of a tracing agency or a recovery service bureau, wherein said one or more alert messages are configured to indicate to a recipient of the one or more other outgoing communications that the location of the computing device is an unauthorized location.

31. The program storage medium of claim 30, wherein restricting access to the information comprises grounding an output line from a keyboard of the computing device.

32. The program storage medium of claim 30, wherein restricting access to the information comprises severing, using a fusible link, a physical connection to a storage device of the computing device, wherein the information is stored on the storage device.

33. The program storage medium of claim 30, wherein restricting access to the information comprises creating one or more decoy files, wherein the information comprises a file, wherein the one or more decoy files are created in addition to the file and the file is not deleted, wherein each of the one or more decoy files has decoy information that corresponds to a portion of the information.

34. The program storage medium of claim 30, wherein the information comprises a file and wherein restricting access to the information comprises creating one or more decoy files and modifying times associated with a given one of the one or more decoy files and the file so that a time associated with the given decoy file is later than a time associated with the file.

* * * * *